United States Patent
Chavez et al.

(10) Patent No.: US 9,864,930 B2
(45) Date of Patent: Jan. 9, 2018

(54) CLUSTERING TECHNIQUE FOR OPTIMIZED SEARCH OVER HIGH-DIMENSIONAL SPACE

(71) Applicant: International Business Machines Corporation, Armonk, NY (US)

(72) Inventors: Aaron J. Chavez, Denver, CO (US); Devin R. Harper, Denver, CO (US); Nicholas A. Lineback, Alameda, CA (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 15/016,647

(22) Filed: Feb. 5, 2016

(65) Prior Publication Data

US 2017/0228615 A1    Aug. 10, 2017

(51) Int. Cl.
*G06K 9/62* (2006.01)

(52) U.S. Cl.
CPC ......... *G06K 9/6218* (2013.01); *G06K 9/6215* (2013.01); *G06K 9/6228* (2013.01); *G06K 9/6255* (2013.01)

(58) Field of Classification Search
CPC ...................................... G06K 9/6218–9/6226
See application file for complete search history.

(56) References Cited

U.S. PATENT DOCUMENTS

| | | | |
|---|---|---|---|
| 6,003,029 A | 12/1999 | Agrawal et al. | |
| 6,507,830 B1 * | 1/2003 | Liu | G06F 17/30707 706/48 |
| 7,941,442 B2 | 5/2011 | Li et al. | |
| 8,145,672 B2 | 3/2012 | Kumaran | |
| 2012/0109943 A1 * | 5/2012 | Yang | G06F 17/30017 707/723 |
| 2015/0339412 A1 * | 11/2015 | Vitaletti | G06Q 50/06 703/1 |
| 2016/0103842 A1 * | 4/2016 | Choromanski | G06K 9/6255 707/737 |
| 2016/0267351 A1 * | 9/2016 | Bober | H04N 19/90 |

OTHER PUBLICATIONS

Parsons et al., "Subspace Clustering for High Dimensional Data: A Review," Sigkdd Explorations, vol. 6, Issue 1, Jun. 2004, pp. 90-105.

Steinbach et al., "The Challenges of Clustering High Dimensional Data," paper co-funded by Army High Performance Computing Research Center cooperative agreement DAAD10-10-2-0014, New Directions in Statistical Physics, Springer-Verlag Berlin Heidelberg, 2004, 33 pages.

* cited by examiner

*Primary Examiner* — Brian P Werner
(74) *Attorney, Agent, or Firm* — VanLeeuwen & VanLeeuwen; William J. Stock (57) ABSTRACT

An approach is provided in which a knowledge manager locates centroids in a high-dimensional vector space that are closest to a new image feature set and performs nearest neighbor searches on feature sets included in clusters corresponding to the located centroids. The knowledge manager then selects feature sets closest to the new image feature set based on the nearest neighbor searches and in turn, marks images corresponding to the selected closest features sets as similar images to a new image corresponding to the new image feature set.

20 Claims, 8 Drawing Sheets

CLUSTERING TECHNIQUE FOR OPTIMIZED SEARCH OVER HIGH-DIMENSIONAL SPACE

BACKGROUND

The present disclosure relates to an optimized approach of locating similar images in a high-dimensional vector space based upon complete image feature sets.

Cluster analysis groups a set of objects in such a way that objects in the same group are more similar to each other than to those in other groups. The similarity between objects is often determined using distance measurements over various dimensions in a dataset. Cluster analysis may be used for a variety of purposes such as statistical data analysis, machine learning, pattern recognition, image analysis, information retrieval, etc.

Traditional clustering algorithms typically consider all dimensions of an input dataset in an attempt to learn as much as possible about each object described. Technology advances have made data collection easier and faster, resulting in larger, more complex datasets with many objects and many dimensions. As such, as datasets become larger and more dimensional, existing clustering algorithms have difficulty maintaining cluster quality and speed.

BRIEF SUMMARY

According to one embodiment of the present disclosure, an approach is provided in which a knowledge manager locates centroids in a high-dimensional vector space that are closest to a new image feature set and performs nearest neighbor searches on feature sets included in clusters corresponding to the located centroids. The knowledge manager then selects feature sets closest to the new image feature set based on the nearest neighbor searches and in turn, marks images corresponding to the selected closest features sets as similar images to a new image corresponding to the new image feature set.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
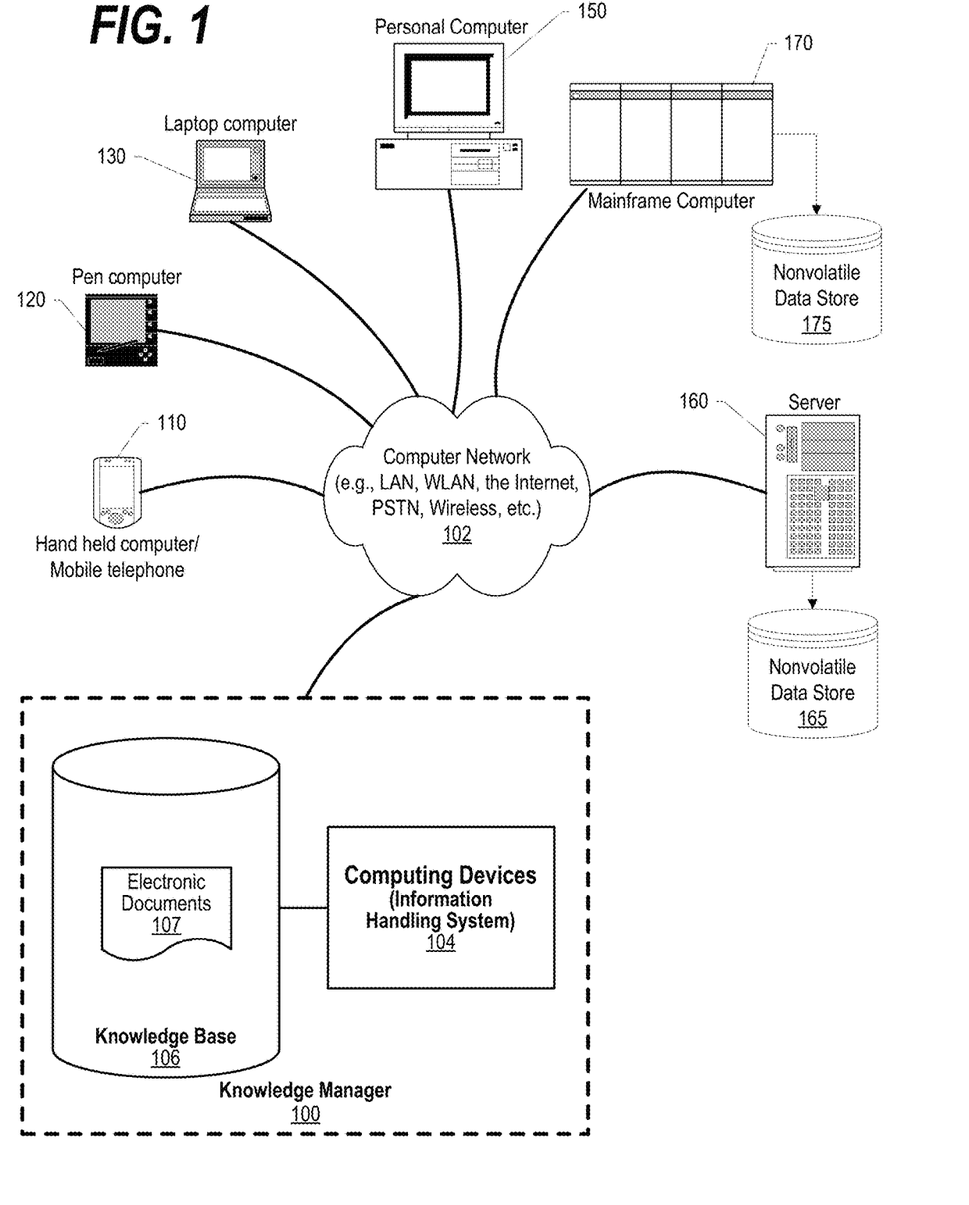
FIG. 1 is a block diagram of a data processing system in which the methods described herein can be implemented.

FIG. 1 depicts a schematic diagram of one illustrative embodiment of a question/answer (QA) system knowledge manager 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
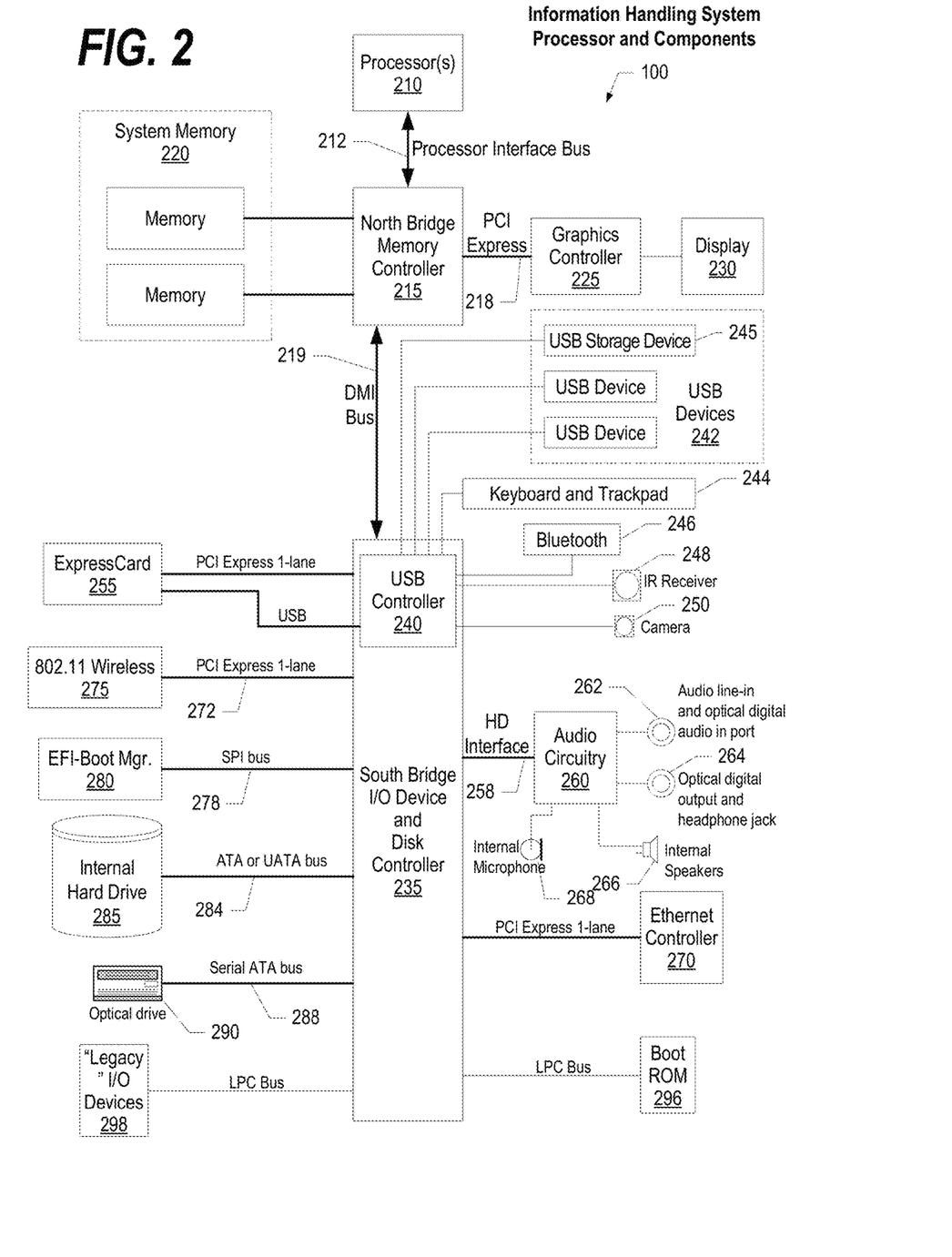
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 7 depict an approach of using random and redundant search methods to cluster a high-dimensional vector space and quickly search the high-dimensional vector space to find images similar to a new image. A knowledge manager locates centroids in a high-dimensional vector space that are closest to a new image feature set and performs nearest neighbor searches on feature sets included in clusters corresponding to the located centroids. The knowledge manager then selects feature sets closest to the new image feature set based on the nearest neighbor searches and in turn, marks images corresponding to the selected closest features sets as similar images to a new image corresponding to the new image feature set.

Figure 3:
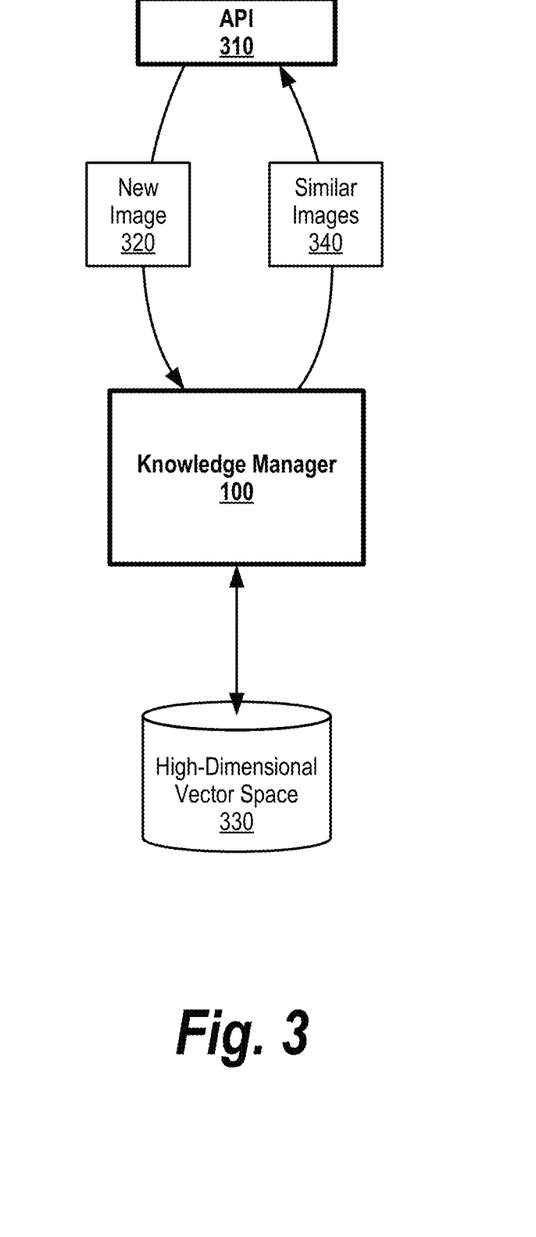
FIG. 3 depicts a knowledge manager that develops a high-dimensional vector space and uses the high-dimensional vector space to identify images similar to a new image.

FIG. 3 depicts knowledge manager 100, which develops high-dimensional vector space 330 by randomly selecting centroids and assigning training images to "m" multiple clusters that correspond to the m centroids closest to the training images. Once trained, knowledge manager 100 maps new image 320 to high-dimensional vector space 330 and locates the "n" closest centroids to new image 320. Knowledge manager 100 then identifies the n corresponding clusters and performs distance measurements on each image within the n corresponding clusters. In turn, knowledge manager 100 marks the "k" nearest neighbors, which correspond to the most similar images, which knowledge manager 100 sends to API 310 as similar images 340. In short and as discussed herein, knowledge manager 100 provides a holistic and precise approach of identifying similar images by considering an image's complete feature set without degrading the feature sets through feature set reduction approaches such as dimensionality reduction.

Figure 4:
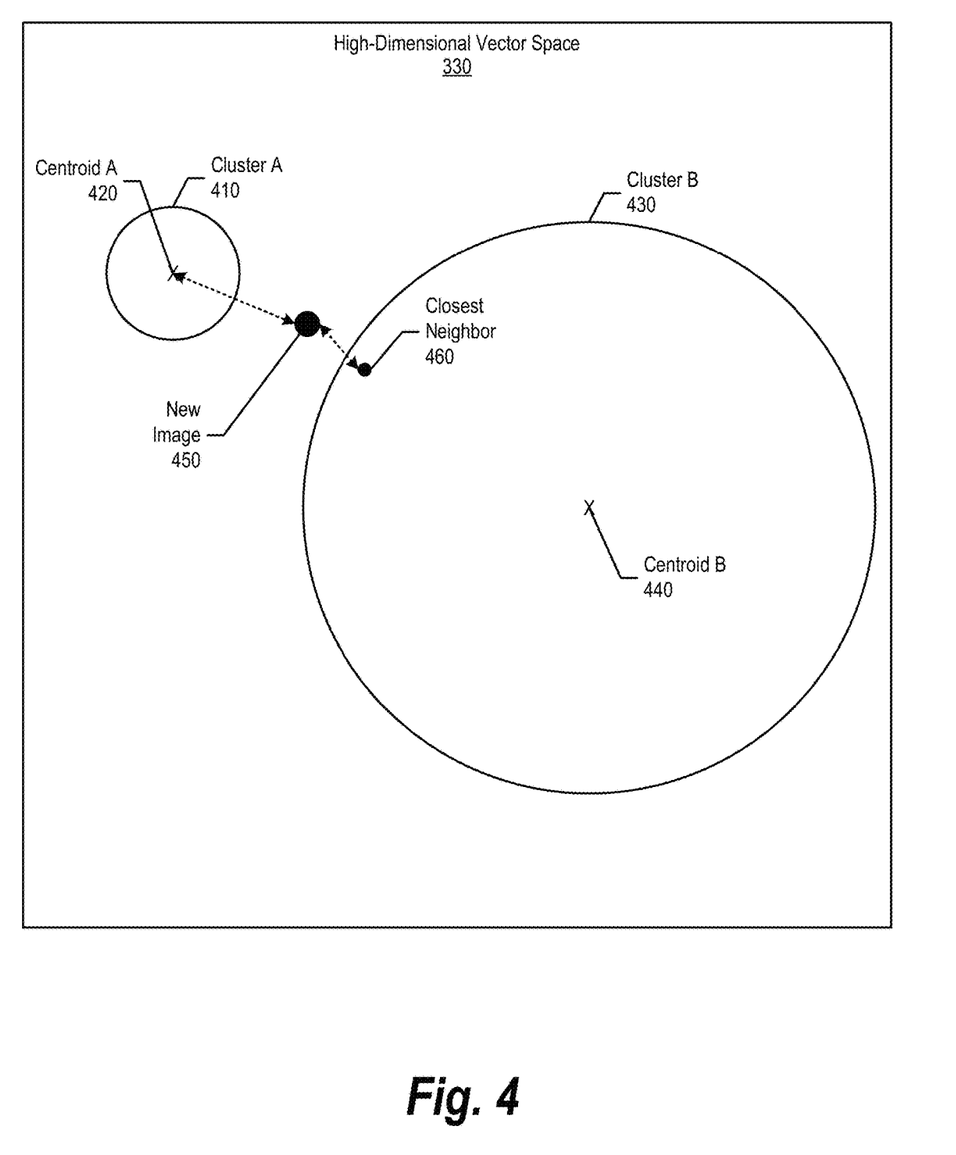
FIG. 4 is a diagram depicting a new image mapped to a high-dimensional vector space that includes multiple clusters.

FIG. 4 is a diagram depicting a new image mapped to a high-dimensional vector space that includes multiple clusters. High-dimensional vector space 330 includes two image clusters A 410 and B 430. For example, cluster A 410 may correspond to images that include dogs and cluster B 430 may correspond to images that include cats. Each cluster is centered around a corresponding centroid. Cluster A 410 centers around centroid A 420 and cluster B 430 centers around centroid B 440.

When new image 450 is received, a knowledge manager evaluates high-dimensional vector space 330 to identify images that are most similar to new image 450. As can be seen, new image 450 is closer to centroid A 420 than centroid B 440, which may indicate that new image 450 belongs to cluster A 410. However, new image 450's closet neighbor 460 belongs to cluster B 430, indicating that new image 450 may belong to cluster B 430. As such, the knowledge manager is not able to merely identify the closest centroid to a new image and assume that similar images are included in the closest centroid's cluster. Instead, as discussed herein, the knowledge manager proceeds through a series of stages to determine n closet centroids, select their corresponding n clusters, and then identify the k closest neighbors within the selected n clusters (see FIGS. 5-8 and corresponding text for further details).

Figure 5:
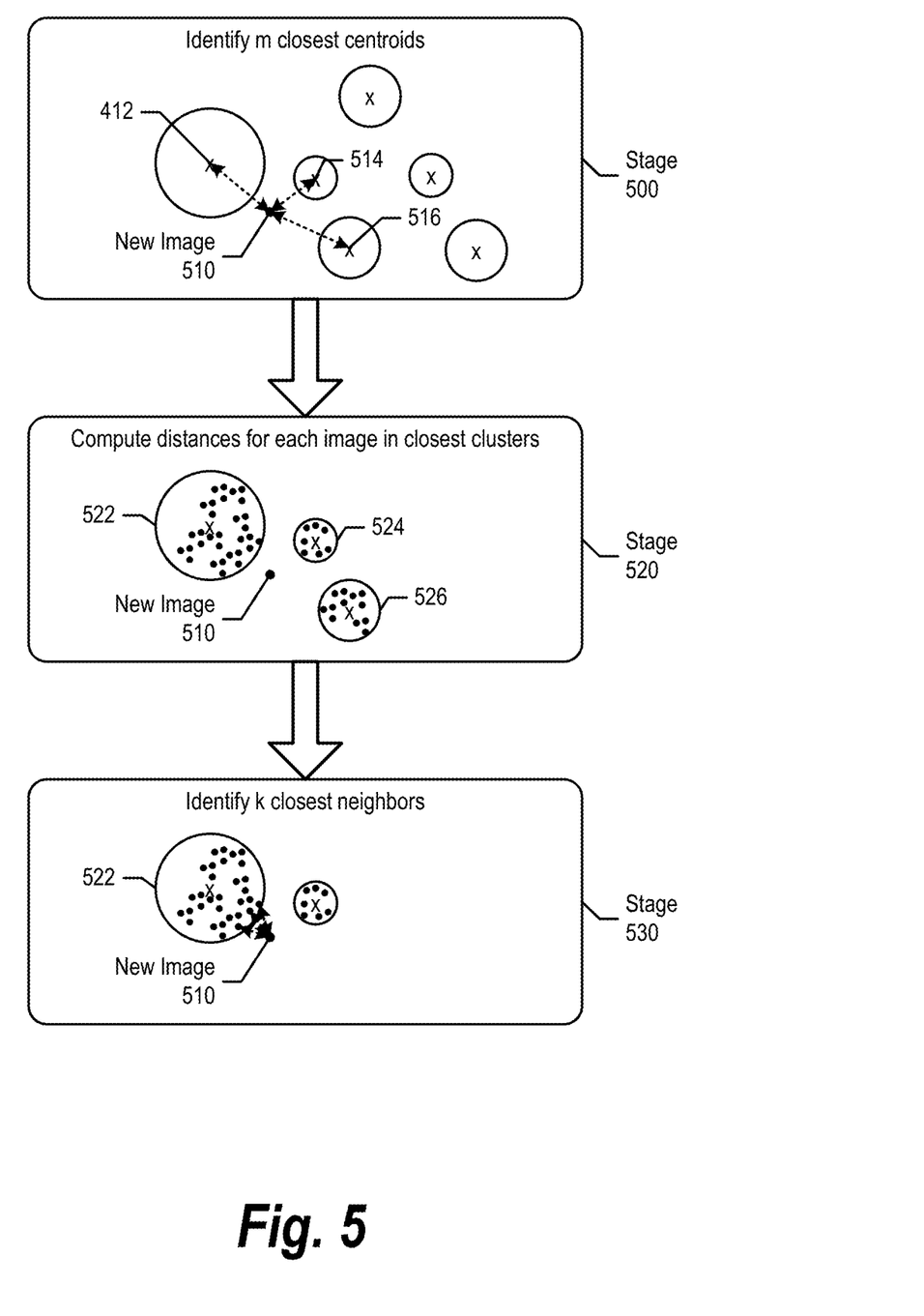
FIG. 5 is a diagram depicting stages performed by a knowledge manager to locate images similar to a new image.

FIG. 5 is a diagram depicting stages performed by a knowledge manager to return images similar to a new image. When a knowledge manager receives new image 510, the knowledge manager identifies the "n" closest centroids in the domain space. Stage 500 shows that centroids 512, 514, and 516 are the closest centroids to new image 510.

At stage 520, the knowledge manager selects n clusters corresponding to the n closest centroids and computes distances from the new image to each member (e.g., image) included in the selected n clusters. Stage 520 shows that the knowledge manager computes distance measurements to each member in cluster 522, 524, and 526. Cluster 522 corresponds to centroid 512, cluster 524 corresponds to centroid 514, and cluster 526 corresponds to centroid 516.

At stage 530, the knowledge manager evaluates the distance measurements and identifies the k closest neighbors. Stage 530 shows that the k closest neighbors are included in cluster 522 and, in turn, provides the k closest neighbors as similar images to API 310. In one embodiment, the knowledge manager assigns new image 510 to cluster 522. In another embodiment, where the k closest neighbors belong to multiple clusters, the knowledge manager assigns new image 510 to each of the multiple clusters.

Figure 6:
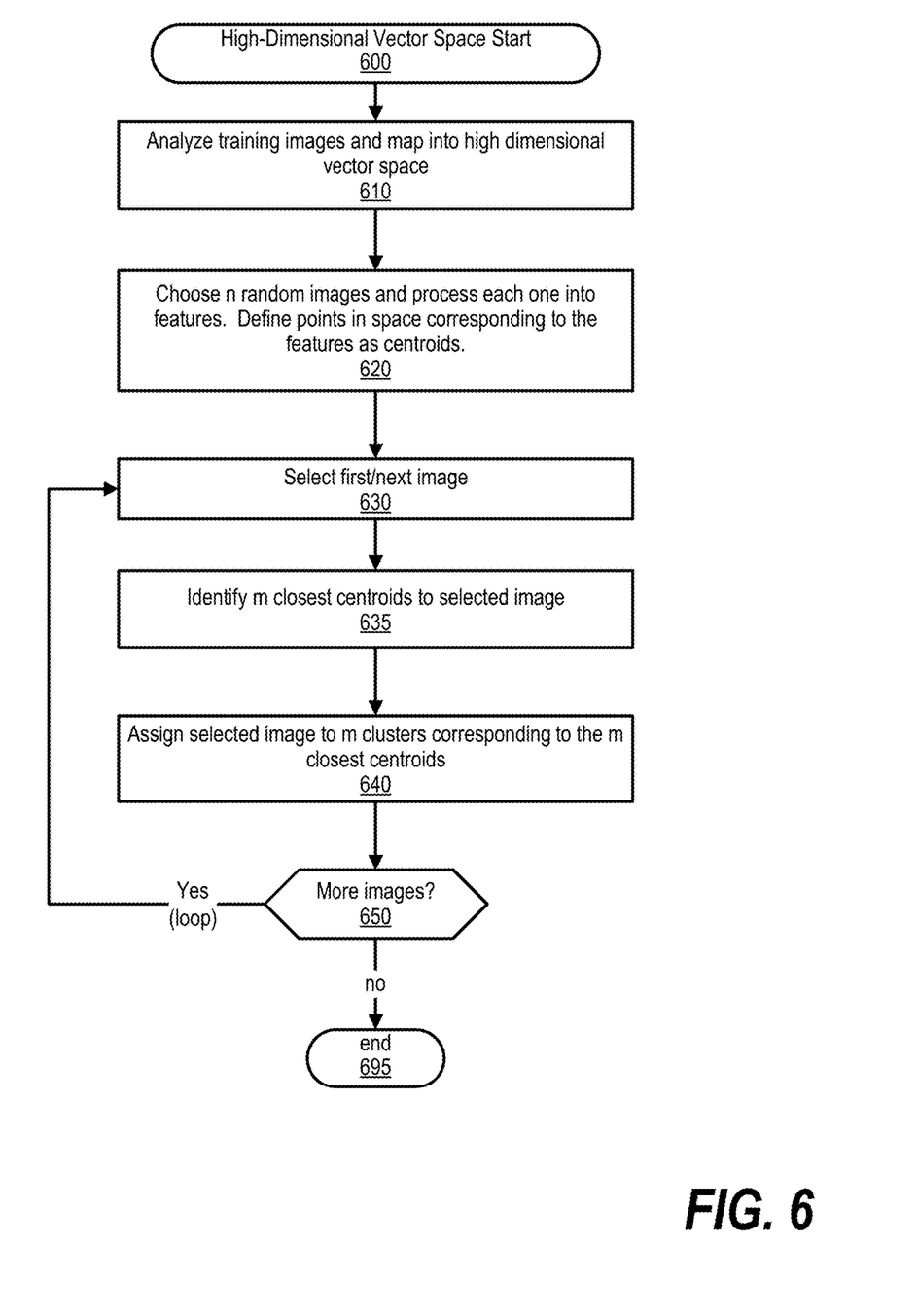
FIG. 6 is an exemplary flowchart depicting steps taken to create a high-dimensional vector space by randomly selecting centroids, identifying m closest centroids to a training image, and assigning the training image to clusters corresponding to the m closest centroids.

FIG. 6 is an exemplary flowchart depicting steps taken to create a high-dimensional vector space by randomly selecting centroids, identifying m closest centroids to an image, and assigning the image to clusters corresponding to the m closest centroids.

Processing commences at 600 whereupon, at step 610, the process analyzes training images and maps the training images into a high-dimensional vector space. At step 620, the process chooses n random images and processes each of the chosen n random images into features. The process then defines points in space as centroids that correspond to the features. For example, FIG. 7 shows six centroids that are defined in high-dimensional vector space 330.

At step 630, the process selects a first image in the training images and, at step 635, the process identifies the m closest centroids to the selected image. Referring to FIG. 7, centroids 720, 730, and 740 are the closest centroids to training image 760. Next, at step 640, the process assigns the selected image to m clusters that correspond to the m closest centroids. For example and referring to FIG. 7, the process assigns training image 760 to clusters corresponding to centroids 720, 730, and 740. In turn, a single training image 760 may be assigned to multiple clusters.

The process determines as to whether there are more training images to evaluate and assign to clusters (decision 650). If there are more training images, then decision 650 branches to the 'yes' branch which loops back to evaluate and assign to m closest clusters corresponding to m closest centroids. This looping continues until there are no more training images to evaluate, at which point decision 650 branches to the 'no' branch exiting the loop. FIG. 6 processing thereafter ends at 695.

Figure 7:
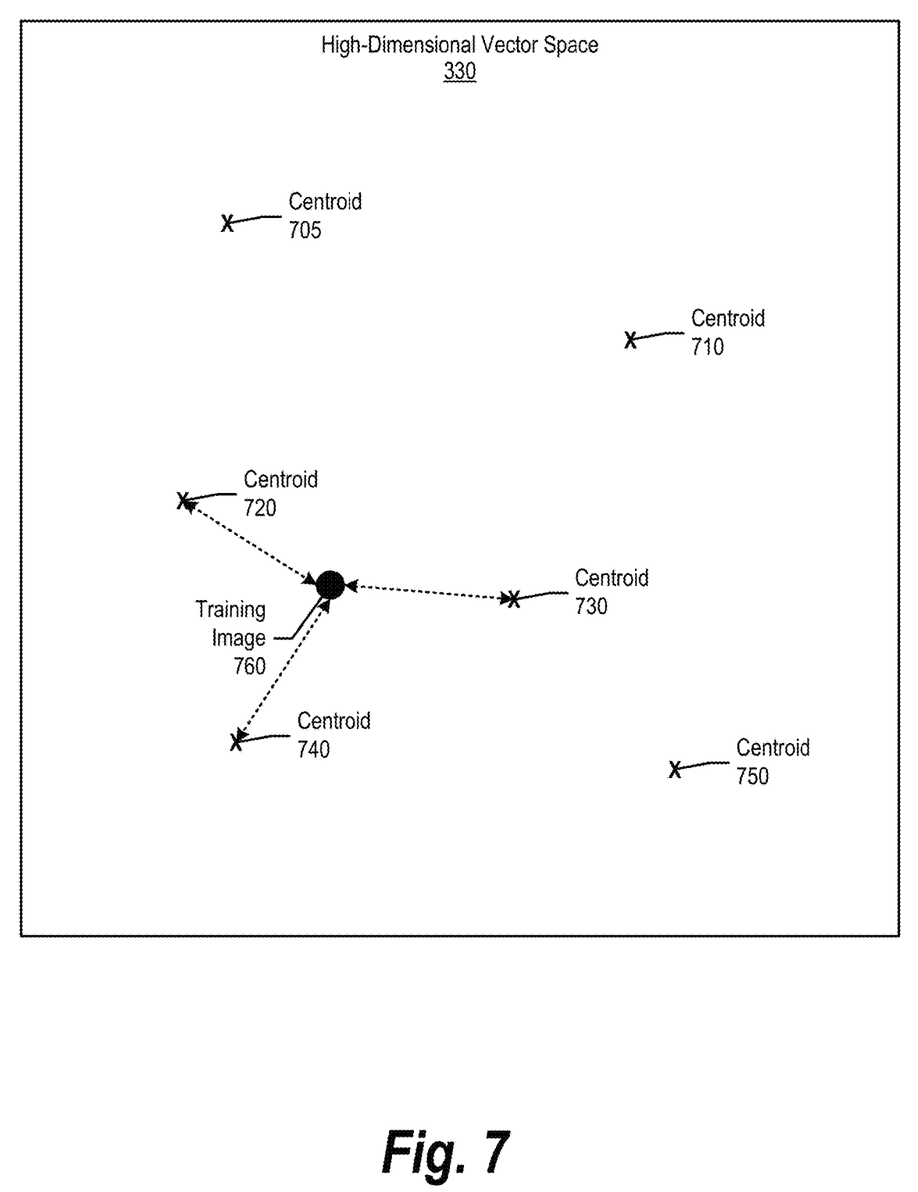
FIG. 7 is an exemplary diagram depicting a training image assigned to multiple clusters within a high-dimensional vector space.

FIG. 7 is an exemplary diagram depicting a training image assigned to multiple clusters within high-dimensional vector space 330. When the knowledge manager develops high-dimensional vector space 330, the knowledge manager randomly selects images and defines points in space as centroids that correspond to features of the randomly selected images, such as centroids 705, 710, 720, 730, 740, and 750. In turn, the knowledge manager processes each image by first identifying m closest centroids. FIG. 7 shows that training image 760 is closest to centroids 720, 730, and 740. As such, the knowledge manager assigns training image 760 to clusters corresponding to centroids 720, 730, and 740. By assigning images to multiple clusters, the probability increases of locating a nearest neighbor to a new image (see FIG. 8 and corresponding text for further details).

Figure 8:
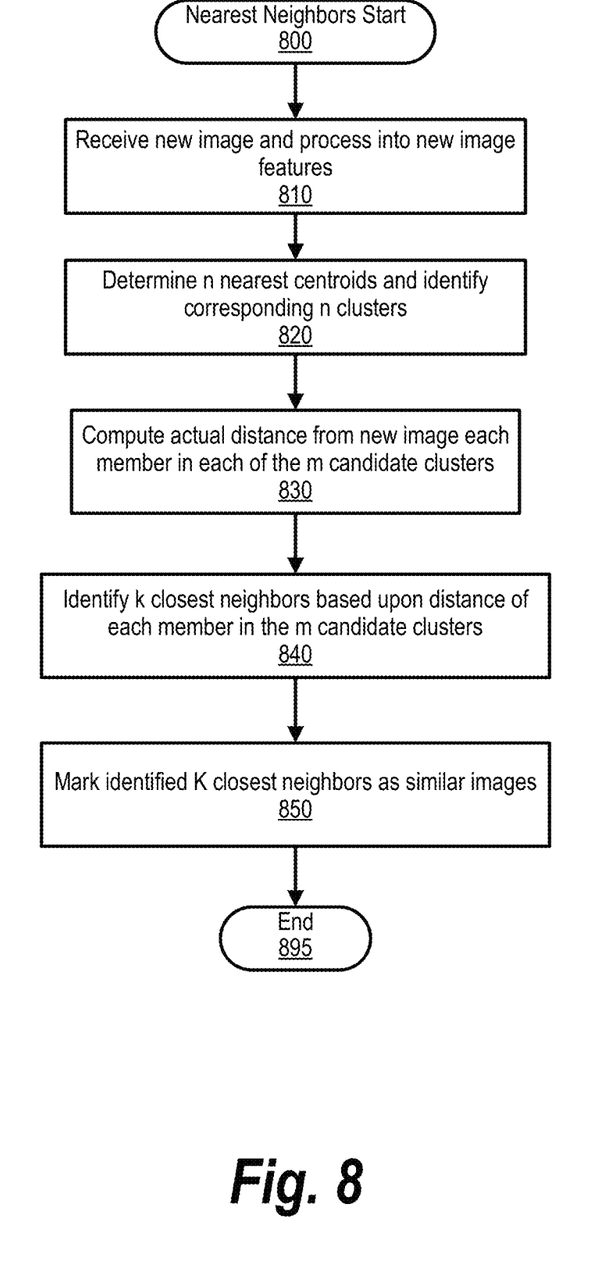
FIG. 8 is an exemplary flowchart depicting steps taken to locate nearest neighbors of a new image in a high-dimensional vector space.

FIG. 8 is an exemplary flowchart depicting steps taken to locate nearest neighbors of a new image in a high-dimensional vector space. Processing commences at 800 whereupon, at step 810, the process receives a new image and processes the image into new image features. At step 820, the process determines the n nearest centroids and identifies their corresponding n clusters. For example, the process may perform distance measurements between the new image features and n centroids within the high-dimensional vector space. In this example, the process may select the five closest centroids and identify the five clusters corresponding to the five closest centroids.

At step 830, the process computes actual distances from the new image to each member in each of the n clusters. Continuing with the example above, assuming that each of the five clusters include 100 members, the process computes 500 distance measurements.

At step 840, the process identifies the k closest neighbors based upon the computed distance measurements. For example, the process may identify ten of the 500 members as closet neighbors. At step 850, the process marks the identified k closest neighbors as similar images and, in one embodiment, the process provides the marked similar images to API 310 for post-processing. In one embodiment, the process also assigns the new image to the clusters in which the k closest neighbors belong. FIG. 8 processing thereafter ends at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

locating a plurality of centroids that are closest to a new image feature set of a new image in a high-dimensional vector space;
in response to locating the plurality of centroids:
identifying a plurality of member image feature sets included in a plurality of clusters corresponding to the located plurality of centroids; and
performing one or more nearest neighbor searches, relative to the new image feature set, on the plurality of member image feature sets;
selecting one or more of a plurality of member image feature sets that are nearest to the new image feature set in response to performing the one or more nearest neighbor searches; and
marking one or more member images corresponding to the selected one or more member image feature sets as a similar image to the new image.

2. The method of claim 1 wherein, prior to locating the plurality of centroids, the method further comprises:
creating the high-dimensional vector space, wherein the creating further comprises:
mapping a plurality of training image feature sets to the high-dimensional vector space; and
randomly selecting a set of the plurality of training image feature sets as training centroids, resulting in a set of training centroids.

3. The method of claim 2 wherein, for each of the plurality of training image feature sets, the method further comprises:
selecting one of the plurality of training image feature sets;
identifying one or more of the set of training centroids that are closest to the selected training image feature set; and
assigning the selected training image feature set membership to each of the identified one or more closest centroids.

4. The method of claim 1 further comprising:
assigning membership of the new image to each of the plurality of clusters.

5. The method of claim 1 wherein the set of centroids include a first centroid and a second centroid, and wherein the second centroid is closer to the new image feature set than the first centroid, and wherein at least one of the selected one or more member image feature sets is included in a first of the plurality of clusters that correspond to the first centroid.

6. The method of claim 5 wherein at least one of the selected one or more member image feature sets is included in a second of the plurality of clusters that correspond to the second centroid.

7. The method of claim 1 wherein the new image feature set encompasses a complete feature set of the image.

8. An information handling system comprising:
one or more processors;
a memory coupled to at least one of the processors; and
a set of computer program instructions stored in the memory and executed by at least one of the processors in order to perform actions of:
locating a plurality of centroids that are closest to a new image feature set of a new image in a high-dimensional vector space;
in response to locating the plurality of centroids:
identifying a plurality of member image feature sets included in a plurality of clusters corresponding to the located plurality of centroids; and
performing one or more nearest neighbor searches, relative to the new image feature set, on the plurality of member image feature sets;
selecting one or more of a plurality of member image feature sets that are nearest to the new image feature set in response to performing the one or more nearest neighbor searches; and
marking one or more member images corresponding to the selected one or more member image feature sets as a similar image to the new image.

9. The information handling system of claim 8 wherein, prior to locating the plurality of centroids, at least one of the one or more processors perform additional actions comprising:
creating the high-dimensional vector space, wherein the creating further comprises:
mapping a plurality of training image feature sets to the high-dimensional vector space; and
randomly selecting a set of the plurality of training image feature sets as training centroids, resulting in a set of training centroids.

10. The information handling system of claim 9 wherein, for each of the plurality of training image feature sets, at least one of the one or more processors perform additional actions comprising:
selecting one of the plurality of training image feature sets;
identifying one or more of the set of training centroids that are closest to the selected training image feature set; and
assigning the selected training image feature set membership to each of the identified one or more closest centroids.

11. The information handling system of claim 8 wherein at least one of the one or more processors perform additional actions comprising:
assigning membership of the new image to each of the plurality of clusters.

12. The information handling system of claim 8 wherein the set of centroids include a first centroid and a second centroid, and wherein the second centroid is closer to the new image feature set than the first centroid, and wherein at least one of the selected one or more member image feature sets is included in a first of the plurality of clusters that correspond to the first centroid.

13. The information handling system of claim 12 wherein at least one of the selected one or more member image feature sets is included in a second of the plurality of clusters that correspond to the second centroid.

14. The information handling system of claim 8 wherein the new image feature set encompasses a complete feature set of the image.

15. A computer program product stored in a computer readable storage medium, comprising computer program code that, when executed by an information handling system, causes the information handling system to perform actions comprising:
locating a plurality of centroids that are closest to a new image feature set of a new image in a high-dimensional vector space;
in response to locating the plurality of centroids:
identifying a plurality of member image feature sets included in a plurality of clusters corresponding to the located plurality of centroids; and
performing one or more nearest neighbor searches, relative to the new image feature set, on the plurality of member image feature sets;

selecting one or more of a plurality of member image feature sets that are nearest to the new image feature set in response to performing the one or more nearest neighbor searches; and marking one or more member images corresponding to the selected one or more member image feature sets as a similar image to the new image.

16. The computer program product of claim 15 wherein, prior to locating the plurality of centroids, the information handling system performs additional actions comprising:

creating the high-dimensional vector space, wherein the creating further comprises:

mapping a plurality of training image feature sets to the high-dimensional vector space; and randomly selecting a set of the plurality of training image feature sets as training centroids, resulting in a set of training centroids.

17. The computer program product of claim 16 wherein, for each of the plurality of training image feature sets, the information handling system performs additional actions comprising:

selecting one of the plurality of training image feature sets;

identifying one or more of the set of training centroids that are closest to the selected training image feature set; and assigning the selected training image feature set membership to each of the identified one or more closest centroids.

18. The computer program product of claim 15 wherein the information handling system performs additional actions comprising:

assigning membership of the new image to each of the plurality of clusters.

19. The computer program product of claim 15 wherein the set of centroids include a first centroid and a second centroid, and wherein the second centroid is closer to the new image feature set than the first centroid, and wherein at least one of the selected one or more member image feature sets is included in a first of the plurality of clusters that correspond to the first centroid.

20. The computer program product of claim 19 wherein at least one of the selected one or more member image feature sets is included in a second of the plurality of clusters that correspond to the second centroid.

* * * * *